US011308717B2

(12) United States Patent
Hashimoto et al.

(10) Patent No.: US 11,308,717 B2
(45) Date of Patent: Apr. 19, 2022

(54) OBJECT DETECTION DEVICE AND OBJECT DETECTION METHOD

(71) Applicant: TOYOTA JIDOSHA KABUSHIKI KAISHA, Toyota (JP)

(72) Inventors: Daisuke Hashimoto, Chofu (JP); Satoshi Takeyasu, Musashino (JP); Kota Hirano, Edogawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 16/551,994

(22) Filed: Aug. 27, 2019

(65) Prior Publication Data
US 2020/0097739 A1 Mar. 26, 2020

(30) Foreign Application Priority Data

Sep. 26, 2018 (JP) .............................. JP2018-181015

(51) Int. Cl.
*G06K 9/00* (2022.01)
*G06V 20/58* (2022.01)
*G06T 7/70* (2017.01)
*B60W 30/095* (2012.01)

(52) U.S. Cl.
CPC ......... *G06V 20/58* (2022.01); *B60W 30/0956* (2013.01); *G06T 7/70* (2017.01); *B60W 2420/42* (2013.01); *B60W 2554/00* (2020.02); *G06T 2207/30261* (2013.01)

(58) Field of Classification Search
None
See application file for complete search history.

(56) References Cited

U.S. PATENT DOCUMENTS

2010/0098290 A1 * 4/2010 Zhang ................ G06K 9/00798
382/100
2019/0317217 A1 * 10/2019 Day ........................ G01S 17/04

FOREIGN PATENT DOCUMENTS

JP 2005-242552 A 9/2005

OTHER PUBLICATIONS

Alex Kendall et al., "Multi-Task Learning Using Uncertainty to Weigh Losses for Scene Geometry and Semantics", CVPR2018, 2018, pp. 1-23.
Wei Liu et al., "SSD: Single Shot MultiBox Detector", ECCV2016, 2016, pp. 1-17.
Shaoqing Ren et al., "Faster R-CNN: Towards Real-Time Object Detection with Region Proposal Networks", NIPS, 2015, pp. 1-14.

* cited by examiner

*Primary Examiner* — Wei Wen Yang
(74) *Attorney, Agent, or Firm* — Sughrue Mion, PLLC

(57) ABSTRACT

An object detection device includes a processor configured to calculate, for each of a plurality of regions in a detection range of the sensor represented in the newest sensor signal among a plurality of sensor signals in time-series acquired by a sensor, a confidence indicating a degree of certainty that an object to be detected is represented in the region; track a first object which has been detected, to detect, in the newest sensor signal, a passed region through which the first object has passed; control, for each of the plurality of regions in the newest sensor signal, a confidence threshold according to whether or not the region is included in the passed region, and detect a second object in a region, among the plurality of regions, with respect to which the confidence for the second object is equal to or higher than the confidence threshold.

6 Claims, 7 Drawing Sheets

OBJECT DETECTION DEVICE AND OBJECT DETECTION METHOD

FIELD

The present invention relates to an object detection device, an object detection method, and a computer program for object detection for detecting an object.

BACKGROUND

When an obstacle exists on a road where a vehicle is traveling, there is a risk of an accident. In view of this situation, a technique has been proposed, in which a vehicle traveling ahead transmits information on the traveling path to a vehicle traveling behind, and when the vehicle traveling behind determines on the basis of the traveling path received from the vehicle traveling ahead that the traveling path has been generated to avoid the obstacle, the vehicle traveling behind warns the driver about the obstacle (see Japanese Unexamined Patent Publication (Kokai) No. 2005-242552, for example).

However, in the technique described above, the obstacle itself is not detected. Meanwhile, techniques for detecting an object represented in an image have been studied. In recent years, in order to detect an object, there have been proposed techniques for improving detection accuracy using a so-called deep neural network (hereinafter, referred to simply as DNN) (see, for example, Wei Liu et al., "SSD: Single Shot MultiBox Detector", ECCV2016, 2016 (hereinafter, referred to as NPL 1), Shaoqing Ren et al., "Faster R-CNN: Towards Real-Time Object Detection with Region Proposal Networks", NIPS, 2015 (hereinafter, referred to as NPL 2), and Alex Kendall et al., "Multi-Task Learning Using Uncertainty to Weigh Losses for Scene Geometry and Semantics", CVPR2018, 2018 (hereinafter, referred to as NPL 3)).

SUMMARY

In such techniques, by learning a DNN using, as teacher data, multiple images in which a known object is represented, the DNN will be able to detect the known object represented in an input image with a high degree of accuracy. However, there is a case in which an object to be detected is an object for which only a small number of images can be used as teacher data. For images in which such an object is represented, the detection accuracy achieved by the DNN is reduced. There is also a case in which the detection accuracy achieved by the DNN is reduced for an image in which a known object looks differently from the way the known object looks in an image included in teacher data. To prevent deterioration in detection accuracy, it is preferable that, for each of all objects to be detected, an image in which the object is represented can be used as teacher data. In fact, however, it may not be possible to prepare, for each of all objects to be detected, an image that can be used as teacher data when the DNN is learned. Therefore, it is desired to improve detection accuracy even for an object for which only a small number of images can be used as teacher data or an image in which an object to be detected looks differently from the way the object looks in an image included in teacher data.

Thus, an object of the present invention is to provide an object detection device that can improve accuracy in object detection.

According to one embodiment, an object detection device is provided. The object detection device includes a processor configured to: calculate, for each of a plurality of regions in a predetermined detection range represented in the newest sensor signal among a plurality of sensor signals in time-series acquired by a sensor for detecting an object present in the predetermined detection range, a confidence indicating a degree of certainty that an object to be detected is represented in the region; track a first object, which has been detected in any of the sensor signals preceding the newest sensor signal among the plurality of sensor signals in time-series, of the objects to be detected, to detect, in the newest sensor signal, a passed region through which the first object has passed; control, for each of the plurality of regions in the newest sensor signal, a confidence threshold applied to the confidence for a second object represented in the region of the objects to be detected according to whether or not the region is included in the passed region; and detect the second object in a region, among the plurality of regions, with respect to which the confidence for the second object is equal to or higher than the confidence threshold.

For the object detection device, the second object is preferably a stationary object or a low-speed moving object.

In addition, in the object detection device, it is preferable that the processor is further configured to: track the first object to detect an avoided region that the first object has avoided in the predetermined detection range represented in the newest sensor signal, and set the confidence threshold applied to a region included in the avoided region among the plurality of regions to a lower value than a confidence threshold applied to a region, among the plurality of regions, other than the avoided region and included in an unpassed region through which the first object has not passed.

Alternatively, the processor preferably sets the confidence threshold applied to a region included in the passed region among the plurality of regions to a higher value than the confidence threshold applied to a region included in the unpassed region among the plurality of regions.

Furthermore, in the object detection device, the sensor is preferably a camera configured to capture the predetermined detection range and the sensor signal is preferably an image that is generated by the camera and in which the predetermined detection range is represented.

According to another embodiment of the present invention, an object detection method is provided. The object detection method includes calculating, for each of a plurality of regions in a predetermined detection range represented in the newest sensor signal among a plurality of sensor signals in time-series acquired by a sensor for detecting an object present in the predetermined detection range, a confidence indicating a degree of certainty that an object to be detected is represented in the region; tracking a first object, which has been detected in any of the sensor signals preceding the newest sensor signal among the plurality of sensor signals in time-series, of the objects to be detected to detect, in the newest sensor signal, a passed region through which the first object has passed; and controlling, for each of the plurality of regions in the newest sensor signal, a confidence threshold applied to the confidence for a second object represented in the region of the objects to be detected according to whether or not the region is included in the passed region, and detecting, in the newest sensor signal, the second object in a region, among the plurality of regions, with respect to which the confidence for the second object is equal to or higher than the confidence threshold.

According to still another embodiment of the present invention, a non-transitory computer-readable recording medium having recorded thereon a computer program for object detection is provided. The computer program for object detection includes instructions that cause a computer to execute a process including: calculating, for each of a plurality of regions in a predetermined detection range represented in the newest sensor signal among a plurality of sensor signals in time-series acquired by a sensor for detecting an object present in the predetermined detection range, a confidence indicating a degree of certainty that an object to be detected is represented in the region; tracking a first object, which has been detected in any of the sensor signals preceding the newest sensor signal among the plurality of sensor signals in time-series, of the objects to be detected to detect, in the newest sensor signal, a passed region through which the first object has passed; and controlling, for each of the plurality of regions in the newest sensor signal, a confidence threshold applied to the confidence for a second object represented in the region of the objects to be detected according to whether or not the region is included in the passed region, and detecting, in the newest sensor signal, the second object in a region, among the plurality of regions, with respect to which the confidence for the second object is equal to or higher than the confidence threshold.

The object detection device according to the present invention provides an advantageous effect that accuracy in object detection can be improved.

DESCRIPTION OF EMBODIMENTS

With reference to the drawings, an object detection device will be described below. The inventors have taken particular note of a fact that it is unlikely that, in a region that an object that travels over time (hereinafter, referred to simply as a moving object) has passed, an object other than the moving object, which has a movement speed lower than that of the moving object, for example, a stationary object or a low-speed moving object exists while it is highly likely that, in a region that the moving object has avoided, an object other than the moving object exists. In view of this, the object detection device tracks an object detected in a plurality of images in time-series to detect a region in a real space that the object has passed (hereinafter, referred to simply as a passed region), sets a confidence threshold with respect to a region in the newest image corresponding to the passed region, which is compared with a confidence indicating a degree of certainty that an object to be detected is represented in the region, to a high value, and thus, the object detection device prevents false detection of an object that is not the object to be detected as the object to be detected in the passed region. In addition, the object detection device tracks the detected object to detect a region in a real space that the object has avoided (hereinafter, referred to simply as an avoided region), sets a confidence threshold with respect to a region in the image corresponding to the avoided region to a low value, and thus, the object detection device enables detection of an object that is present in the avoided region even when the object is one of such objects that a classifier for object detection cannot be sufficiently learned (hereinafter, referred to as a rare object for the sake of convenience) though the object is an object to be detected. In this manner, the object detection device can improve detection accuracy. Note that the rare object may include an object that is not represented in any image included in teacher data even though the object should be regarded as an object to be detected, i.e., an unknown object.

An example of the object detection device applied to a vehicle control system will be described below. In this example, the object detection device detects, by executing an object detection process on an image acquired by a camera installed in a vehicle, various types of objects that exist around the vehicle, for example, other person's vehicles, human beings, road signs, road markings, or the like. In this example, the rare object includes, for example, a vehicle having a peculiar shape, a vehicle carrying a peculiar load, an unusually dressed person, an animal other than human beings, or various types of fallen objects fallen on the road.

Figure 1:
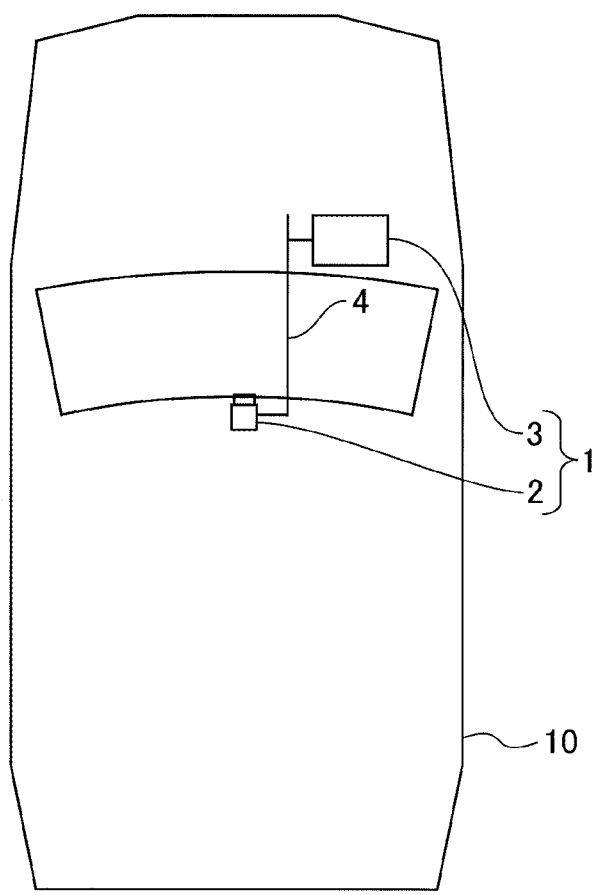
FIG. 1 is a schematic configuration diagram of a vehicle control system in which an object detection device is installed.
Figure 2:
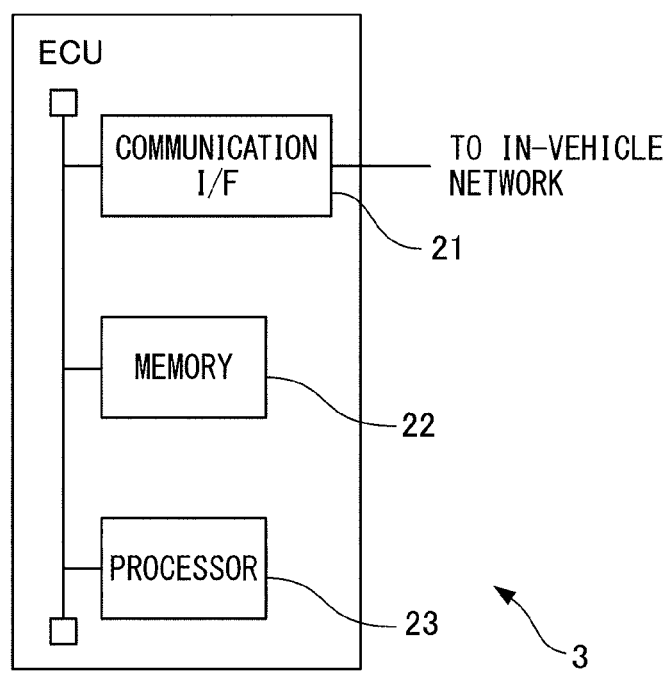
FIG. 2 is a hardware configuration diagram of an electronic control unit, which is an embodiment of the object detection device.

FIG. 1 is a schematic configuration diagram of the vehicle control system in which the object detection device is installed. FIG. 2 is a hardware configuration diagram of an electronic control unit, which is an embodiment of the object detection device. In the present embodiment, a vehicle control system 1 that is installed in a vehicle 10 and that controls the vehicle 10 includes a camera 2 for imaging the surroundings of the vehicle 10 and an electronic control unit (ECU) 3, which is an example of the object detection device. The camera 2 and the ECU 3 are communicatively connected via an in-vehicle network 4 conforming to a standard such as the Controller Area Network.

The camera 2 is an example of an imaging unit, which is a sensor for detecting an object present in a predetermined detection range, and includes a two-dimensional detector configured with an array of photoelectric conversion elements having sensitivity to visible light such as a CCD image sensor or a C-MOS image sensor and an imaging optical system that forms an image of a region to be imaged on the two-dimensional detector. The camera 2 is mounted in such a way that it is oriented in the front direction of the vehicle 10, for example, in a vehicle interior of the vehicle 10. The camera 2 images a region ahead of the vehicle 10 at every predetermined imaging period (for example, 1/30 seconds to 1/10 seconds) and generates an image in which the region ahead is captured. The image acquired by the camera 2 may be a color image or a gray image. Note that the image generated by the camera 2 is an example of a sensor signal.

Every time the camera 2 generates an image, the camera 2 outputs the generated image to the ECU 3 via the in-vehicle network 4.

The ECU 3 controls the vehicle 10. In the present embodiment, the ECU 3 controls the vehicle 10 in such a way that the vehicle 10 performs automated driving on the basis of an object detected in images in time-series acquired by the camera 2. For this purpose, the ECU 3 includes a communication interface 21, a memory 22, and a processor 23.

The communication interface 21 is an example of a communication unit, and the communication interface 21 includes an interface circuit for connecting the ECU 3 to the in-vehicle network 4. In other words, the communication interface 21 is connected to the camera 2 via the in-vehicle network 4. Every time the communication interface 21 receives an image from the camera 2, the communication interface 21 passes the received image to the processor 23.

The memory 22 is an example of a storage unit, and the memory 22 includes, for example, a volatile semiconductor memory and a non-volatile semiconductor memory. The memory 22 stores various types of data used in the object detection process executed by the processor 23 of the ECU 3, such as images received from the camera 2, various types of parameters for specifying the classifier used in the object detection process, and various types of thresholds used in the object detection process. In addition, the memory 22 may store map information or the like.

The processor 23 is an example of a control unit, and the processor 23 includes one or more CPUs (Central Processing Unit) and a peripheral circuit thereof. The processor 23 may further include another arithmetic circuit such as an arithmetic logic unit, a numeric data processing unit, or a graphics processing unit. Every time the processor 23 receives an image from the camera 2 while the vehicle 10 is traveling, the processor 23 executes a vehicle control process that includes the object detection process on the received image. In addition, the processor 23 controls the vehicle 10 in such a way that the vehicle 10 performs automated driving on the basis of an object detected around the vehicle 10.

Figure 3:
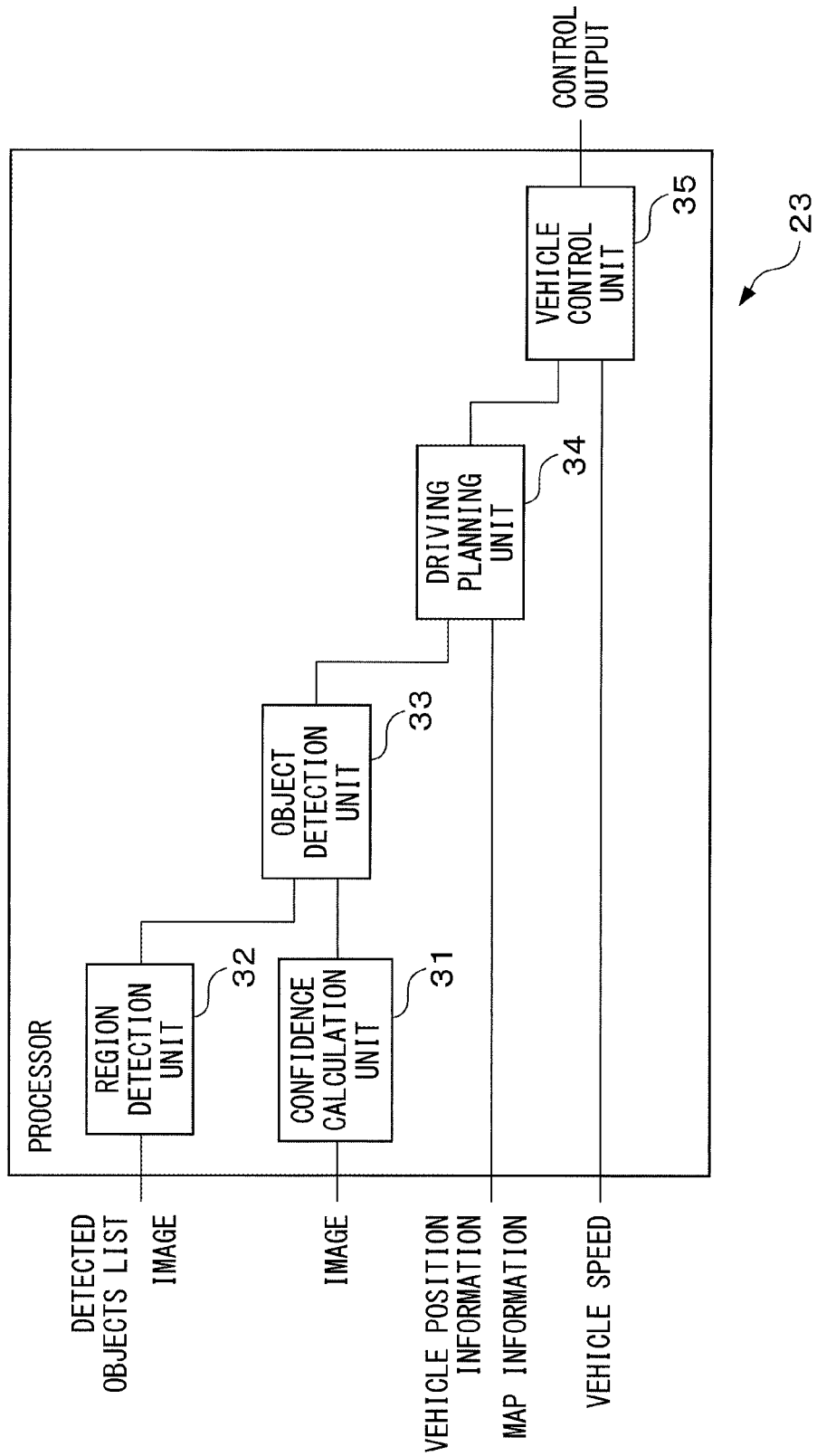
FIG. 3 is a functional block diagram of a processor of the electronic control unit relating to a vehicle control process that includes an object detection process.

FIG. 3 is a functional block diagram of the processor 23 of the ECU 3 relating to the vehicle control process that includes the object detection process. The processor 23 includes a confidence calculation unit 31, a region detection unit 32, an object detection unit 33, a driving planning unit 34, and a vehicle control unit 35. Each of the units included in the processor 23 is a functional module achieved by, for example, a computer program operating on the processor 23. Alternatively, each of the units included in the processor 23 may be a dedicated arithmetic circuit provided in the processor 23. Furthermore, of these units included in the processor 23, the confidence calculation unit 31, the region detection unit 32, and the object detection unit 33 execute the object detection process.

Every time the confidence calculation unit 31 receives an image from the camera 2, the confidence calculation unit 31 inputs the received newest image to a classifier to calculate, for each of a plurality of regions in the image, a confidence indicating a degree of certainty that an object to be detected is captured in the region.

In the present embodiment, the confidence calculation unit 31 uses as the classifier, a DNN that has been learned in advance in such a way as to calculate, for each of the plurality of regions in the image, the confidence for each type of object to be detected. The DNN used by the confidence calculation unit 31 may have a structure, for example, the one similar to that of a Single Shot MultiBox Detector (SSD) described in NPL 1 or that of a Faster R-CNN described in NPL 2.

Figure 4:
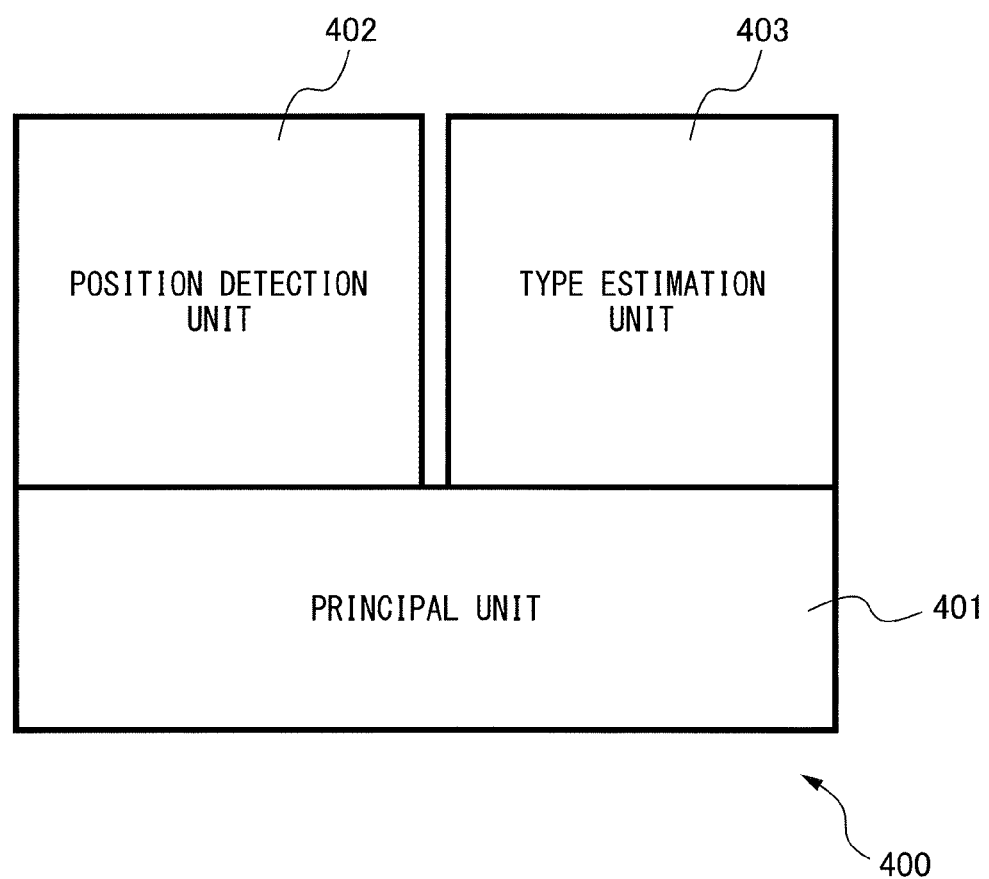
FIG. 4 is a diagram illustrating an example configuration of a DNN used as a classifier.

FIG. 4 is a diagram illustrating an example configuration of the DNN used as the classifier. A DNN 400 includes a principal unit 401 provided on an input side to which an image is input, and a position detection unit 402 and a type estimation unit 403, which are provided on an output side relative to the principal unit 401. The position detection unit 402 outputs, on the basis of an output from the principal unit 401, a rectangle circumscribed to a region in which the object to be detected is represented in the image. The type estimation unit 403 calculates, on the basis of the output from the principal unit 401, the confidence for each type of object represented in the region detected by the position detection unit 402. Note that the position detection unit 402 and the type estimation unit 403 may be integrally formed.

The principal unit 401 may be, for example, a convolutional neural network (CNN) that includes layers that are serially connected from the input side to the output side. The layers include two or more convolutional layers. In addition, the layers included in the principal unit 401 may include a pooling layer provided for every one or more convolutional layers. Furthermore, the layers included in the principal unit 401 may include one or more fully connected layers. For example, the principal unit 401 may have a configuration similar to that of a base layer of an SSD. In this case, similarly to VGG-16, the principal unit 401 may be configured in the sequence from the input side, a two-layered convolutional layer, a pooling layer that performs MaxPooling (i.e., outputting the maximum value of n×n inputs) (hereinafter, referred to simply as a pooling layer), two convolutional layers, a pooling layer, three convolutional layers, a pooling layer, three convolutional layers, a pooling layer, three convolutional layers, a pooling layer, and three fully connected layers. Alternatively, the principal unit 401 may be configured in accordance with other CNN architectures such as VGG-19, AlexNet, or Network-In-Network.

When an image is input, the principal unit 401 performs a calculation in each layer with respect to the image and outputs a feature map calculated from the image.

To each of the position detection unit 402 and the type estimation unit 403, the feature map output from the principal unit 401 is input. The position detection unit 402 and the type estimation unit 403 may be individually, for example, a CNN that includes a plurality of layers that are serially connected from the input side to the output side. In each of the position detection unit 402 and the type estimation unit 403, the layers included in the CNN include two or more convolutional layers. In addition, in each of the position detection unit 402 and the type estimation unit 403, the layers included in the CNN may include a pooling layer provided for every one or more convolutional layers. Note that the convolutional layers and the pooling layer included in the CNN may be common among the position detection unit 402 and the type estimation unit 403. Furthermore, in each of the position detection unit 402 and the type estimation unit 403, the layers may include one or more fully connected layers. In this case, the fully connected layer is preferably provided on the output side relative to each convolutional layer. In addition, an output from each convolutional layer may be directly input to the fully connected layer. An output layer of the type estimation unit 403 may be a softmax layer that calculates the confidence for each type of object to be detected according to a softmax function, or the output layer may be a sigmoid layer that calculates the confidence for each type of object to be detected according to a sigmoid function.

Alternatively, the DNN 400 may include a configuration for calculating, with respect to every pixel of the input image, the confidence for each type of object similarly to, for example, semantic segmentation.

For example, the position detection unit 402 and the type estimation unit 403 have been learned in such a way as to output the confidence for each type of object to be detected, for example, with respect to every region of various sizes and various aspect ratios at various positions on the image. Therefore, when an image is input, a classifier 400 outputs the confidence for each type of object to be detected with respect to every region of various sizes and various aspect ratios at various positions on the image.

The image (teacher image) included in the teacher data used to learn the classifier 400 is tagged with, for example, a type of the object to be detected (for example, cars, human beings, animals, road signs, road markings, fallen objects, other objects on the road, or the like) and a rectangle circumscribed to the object to be detected, which indicates the region in which the object is represented.

The classifier 400 has been learned by using multiple teacher images as described above in accordance with a learning technique such as the backpropagation method. The processor 23 can detect in an image, by using the classifier 400 that has been learned in this manner, an object to be detected, especially an object for which multiple teacher images may be prepared, with a high degree of accuracy.

The confidence calculation unit 31 registers a position and a bound of each region on the image and the confidence for each type of object calculated with respect to the region in a detection target object candidates list, which is a list of candidates for the objects to be detected. The confidence calculation unit 31 then outputs the detection target object candidates list to the object detection unit 33.

The region detection unit 32 receives feedback of an output from the object detection unit 33 with respect to the image immediately preceding the newest image, tracks the object that has been already detected by the object detection unit 33, and detects a passed region through which the object being tracked has passed. In addition, the region detection unit 32 detects an avoided region that the object being tracked has avoided.

For this purpose, the region detection unit 32 generates, for the image immediately preceding the newest image, a pixel region (bitmap image) in which the object detected by the object detection unit 33 is present, and by further executing a viewing transformation process using information on the camera 2 such as the mounting position of the camera 2 in the vehicle 10, transforms the bitmap image of the object being tracked into a bird's eye image (viewing transformation to a bird's eye view). In the process, the region detection unit 32 may estimate a distance from the vehicle 10 to the detected object on the basis of the size of the object on the image and identify a position of each point of the detected object on the bird's eye image on the basis of the estimated distance. For example, for each type of object to be detected, a reference size for the object on the image, which is the size when the distance from the vehicle 10 to the object is a predetermined reference distance, is stored in the memory 22 in advance. In this manner, the region detection unit 32 can determine a distance calculated by multiplying the reference distance by a ratio of the reference size for the detected object to the size of the detected object on the image as the estimated distance to the detected object. The region detection unit 32 then tracks the object detected in respective images by executing a tracking process on a series of bird's eye images obtained from the image immediately preceding the newest image and images prior to that using the Kalman filter, a particle filter, or the like, and obtains a path of the object. The region detection unit 32 calculates, on the basis of the path, a relative position and a relative speed of each point on the object being tracked relative to the vehicle 10 at the time of acquiring respective images corresponding to the series of bird's eye images. The relative position is expressed, for example, in a camera coordinate system with the camera 2 at the origin.

The region detection unit 32 further obtains, on the basis of the positions and the orientations of the vehicle 10 at the time of acquiring respective images corresponding to the series of bird's eye images, a transformation equation for transforming the camera coordinate system into a world coordinate system with a reference point fixed in a real space at the origin. The region detection unit 32 then transforms relative positions of respective points on the object being tracked relative to the vehicle 10 at the time of acquiring respective images into positions in the world coordinate system according to the transformation equation. Note that the region detection unit 32 can estimate the position, the speed, and the orientation of the vehicle 10, for example, on the basis of current position information indicating a current position of the vehicle 10 obtained from a GPS receiver (not illustrated) installed in the vehicle 10. Alternatively, the position, the speed, and the orientation of the vehicle 10 may be estimated by means of a localization process in which a localization processing unit (not illustrated) performs matching with map information using a result of recognition by the confidence calculation unit 31 and the object detection unit 33 of the images acquired by the camera 2. Alternatively, the position, the speed, and the orientation of the vehicle 10 may be estimated by means of a Simultaneous Localization and Mapping (SLAM) process executed by the localization processing unit (not illustrated) using a result of recognition by the confidence calculation unit 31 and the object detection unit 33 of the images acquired by the camera 2. The region detection unit 32 then determines a region obtained by linking the positions in the world coordinate system of respective points on the object being tracked at the time of acquiring respective images as a passed region.

The region detection unit 32 further calculates, from a change in positions and speeds in the world coordinate system of the object being tracked at the time of acquiring respective images (for example, positions of a centroid of the set of points on the object), an acceleration of the object in a direction orthogonal to the traveling direction of the object at the time of acquiring respective images. The region detection unit 32 then determines, when the acceleration is equal to or higher than a predetermined threshold, that the object has performed an avoidance behavior. The region detection unit 32 determines a region which has a certain width, is separated from the passed region by a certain distance (for example, 0 to 2 m), and is located on the side opposite to the direction in which the object is accelerated relative to the passed region of the object in a certain period from when it is determined that the object has performed the avoidance behavior, as an avoided region. Note that the certain width may be, for example, a width obtained by adding a certain offset (for example, 1 to 3 m) to the width of the object being tracked in the direction orthogonal to the traveling direction of the object.

In another embodiment, the region detection unit 32 calculates, from the positions and the speeds in the world coordinate system of the object being tracked at the time of acquiring respective images, an acceleration of the object in a direction orthogonal to the traveling direction of the lane in which the object is traveling (or a direction orthogonal to a lane marking such as a white line). The region detection unit 32 then determines, when the acceleration is equal to or higher than a predetermined threshold, that the object has performed an avoidance behavior. The region detection unit 32 determines a region which has a certain width, is separated from the passed region by a certain distance (for example, 0 to 2 m), and is located on the side opposite to the direction in which the object is accelerated relative to the passed region of the object in a certain period from when it is determined that the object has performed the avoidance behavior and, as an avoided region. Note that the certain width may be, for example, a width obtained by adding a certain offset (for example, 1 to 3 m) to the width of the object being tracked in the direction orthogonal to the traveling direction of the object.

The region detection unit 32 calculates, on the basis of the position and the orientation of the vehicle 10 at the time of acquiring the newest image, an inverse transformation equation for transforming the world coordinate system into the camera coordinate system. The region detection unit 32 then transforms each of the passed region and the avoided region expressed in the world coordinate system into a region expressed in the camera coordinate system according to the inverse transformation equation. The region detection unit 32 further projects, using information on the camera 2 such as the mounting position of the camera 2 in the vehicle 10, the passed region and the avoided region expressed in the camera coordinate system onto the newest image. In this manner, the region detection unit 32 can identify regions on the newest image corresponding to the passed region and the avoided region. Note that the regions on the newest image corresponding to the passed region and the avoided region are represented in the form of a bitmap image.

The region detection unit 32 informs the object detection unit 33 of the passed region and the avoided region projected onto the newest image.

The object detection unit 33 controls, for each of a plurality of regions with respect to which the confidence is calculated in the newest image acquired by the camera 2, the confidence threshold, which is compared with the confidence depending on whether the region is included in the passed region or the avoided region. In the present embodiment, the object detection unit 33 sets the confidence threshold applied to the region other than the passed region and the avoided region (hereinafter, referred to as, for the sake of convenience, an unpassed region) to a first confidence threshold (for example, 0.7 to 0.9). The object detection unit 33 further sets the confidence threshold applied to the passed region to a second confidence threshold which is higher than the first confidence threshold (for example, the first confidence threshold+0.05 to 0.1). This is because it is unlikely that there is an object other than the object being tracked that has passed the passed region in the passed region.

In contrast, the object detection unit 33 sets the confidence threshold applied to the avoided region to a third confidence threshold which is lower than the first confidence threshold (for example, the first confidence threshold−0.1 to 0.2). This is because it is highly likely that there is an object that has caused the object being tracked to perform the avoidance behavior in the avoided region. In addition, the object that may be present in the avoided region is not limited to an object that can be sufficiently learned by the classifier, and the object may be a rare object such as some kind of fallen object or an animal other than human beings. In view of this, by setting the confidence threshold applied to the avoided region to a lower value than the confidence threshold applied to the unpassed region, even when a rare object is present in the avoided region, the processor 23 can prevent failure in detecting the object present in the avoided region.

Note that, since the confidence calculation unit 31 calculates the confidence for each type of object (cars, human beings, fallen objects, or the like), the object detection unit 33 may control the confidence threshold applied to the passed region or the avoided region for each type of object. For example, when the type of the object is a car, since an absolute speed of the object (a relative speed relative to the ground) may be high and the object may move frequently between the avoided region and the unpassed region, the confidence calculation unit 31 may determine not to control the confidence threshold.

The object detection unit 33 further detects, among the plurality of regions in the newest image acquired by the camera 2, a region with respect to which the confidence for any type of the object is equal to or higher than the confidence threshold applied to the region as the object region in which the type of the object is represented. In this case, the object detection unit 33 determines which region in the image corresponding to the passed region, the avoided region, or the unpassed region includes the region of interest. When the region of interest is included in the region in the image corresponding to the unpassed region, the object detection unit 33 compares the confidence with the first confidence threshold. When the region of interest is included in the region in the image corresponding to the passed region, the object detection unit 33 compares the confidence with the second confidence threshold. When the region of interest is included in the region in the image corresponding to the avoided region, the object detection unit 33 compares the confidence with the third confidence threshold. Note that, when the region of interest overlaps with two or more of the regions in the image corresponding to the passed region, the unpassed region, or the avoided region, the object detection unit 33 may determine that the region of interest is included in the region, among the regions, with which the region of interest overlaps most. Alternatively, the object detection unit 33 may determine that the region of interest is included in the region in which the centroid of the region of interest is contained. Alternatively, since the passed region, the unpassed region, and the avoided region are individually set on the road, the object detection unit 33 may determine that the region of interest is included in the region, among the regions, which most includes the lower end of the region of interest.

Note that, when a plurality of object regions in which an object of the same type is represented are detected in one image and those object regions at least partially overlap with each other, the object detection unit 33 may output only the region with respect to which the confidence is maximum among the plurality of object regions.

The object detection unit 33 registers a position and a bound of each of the object regions on the image and the type of the object determined with respect to the region in the detected objects list, which is a list of detected objects. The object detection unit 33 then stores the detected objects list in the memory 22.

Figure 5:
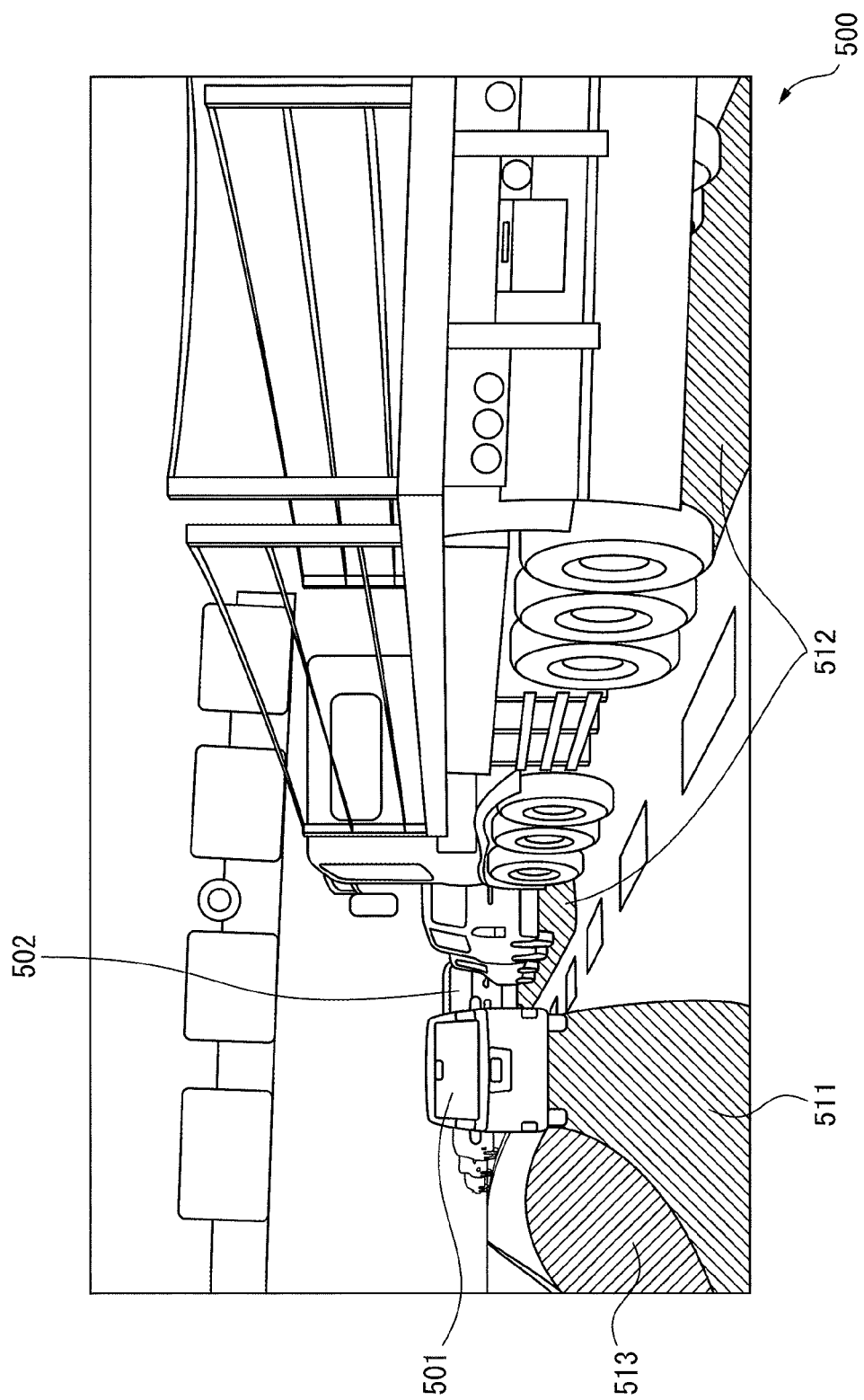
FIG. 5 is a diagram illustrating an example of a relationship between a confidence threshold to be applied and an unpassed region, a passed region, and an avoided region.

FIG. 5 is a diagram illustrating an example of a relationship between the confidence threshold to be applied and the unpassed region, the passed region, and the avoided region. In an image 500, a vehicle 501 and a vehicle 502 are tracked. In this case, with respect to a region 511 in the image 500 corresponding to the passed region through which the vehicle 501 has passed and a region 512 in the image 500 corresponding to the passed region through which the vehicle 502 has passed, the second confidence threshold, which is higher than the first confidence threshold, is applied. Therefore, it is unlikely that an object is detected in the region 511 and the region 512.

Meanwhile, since the vehicle 501 has performed an avoidance behavior, a route of the vehicle 501 is shifted in a direction orthogonal to a traveling direction of the vehicle 501. As a result, an avoided region is set, and the avoided region is represented as a region 513 adjacent to the region 511 in the image 500. With respect to the region 513, the third confidence threshold, which is lower than the first confidence threshold, is applied. Therefore, an object is more likely to be detected in the region 513. In addition, with respect to regions other than the regions 511 to 513 in the image, the region corresponds to an unpassed region, and therefore, the first confidence threshold is applied to the region.

The driving planning unit 34 generates, with reference to the detected objects list obtained for each image, one or more trajectories to be traveled for the vehicle 10 in such a way that the object existing around the vehicle 10 and the vehicle 10 do not collide. The trajectories to be traveled are represented, for example, as a set of target positions for the vehicle 10 at times from the current time to a certain time later. For example, every time the driving planning unit 34 receives the detected objects list from the object detection unit 33, similarly to the region detection unit 32, the driving planning unit 34 transforms, by executing the viewing transformation process using information on the camera 2 such as the mounting position of the camera 2 in the vehicle 10, coordinates in the image of the object in the detected objects list into coordinates in the bird's eye image (bird's eye coordinates). The driving planning unit 34 then tracks, by executing the tracking process on a series of bird's eye coordinates using the Kalman filter, a particle filter, or the like, the objects registered in the detected objects list, and estimates, on the basis of the path obtained from the tracking result, a trajectory for each object up to a certain time later. The driving planning unit 34 generates, on the basis of the estimated trajectory for each object being tracked, a trajectory to be traveled for the vehicle 10 in such a way that, for any object, an estimated value of the distance between each object being tracked and the vehicle 10 is equal to or greater than a certain distance until a certain time later. In the process, the driving planning unit 34 may confirm, with reference to, for example, information on the current position of the vehicle 10 acquired from a GPS receiver (not illustrated) installed in the vehicle 10 and map information stored in the memory 22, the number of lanes in which the vehicle 10 can travel. In addition, the driving planning unit 34 may generate the trajectory to be traveled in such a way that, when there are a plurality of lanes in which the vehicle 10 can travel, the vehicle 10 may change lanes in which it travels.

Note that the driving planning unit 34 may generate a plurality of trajectories to be traveled. In this case, the driving planning unit 34 may select a route among the plurality of trajectories to be traveled in such a way that the sum of absolute values of accelerations of the vehicle 10 is minimum.

The driving planning unit 34 informs the vehicle control unit 35 of the generated trajectory to be traveled.

The vehicle control unit 35 controls respective units of the vehicle 10 in such a way that the vehicle 10 travels along the informed trajectory to be traveled. For example, the vehicle control unit 35 calculates a target acceleration of the vehicle 10 according to the informed trajectory to be traveled and a current vehicle speed of the vehicle 10 measured by a vehicle speed sensor (not illustrated), and sets an accelerator position or a brake pedal position to achieve the target acceleration. The vehicle control unit 35 then calculates an amount of fuel consumption according to the set accelerator position, and outputs a control signal corresponding to the amount of fuel consumption to a fuel injection device of an engine of the vehicle 10. Alternatively, the vehicle control unit 35 outputs a control signal corresponding to the set brake pedal position to a brake of the vehicle 10.

The vehicle control unit 35 further calculates, when the vehicle 10 changes its course in order to travel along the trajectory to be traveled, a target steering angle for the vehicle 10 according to the trajectory to be traveled, and outputs a control signal corresponding to the target steering angle to an actuator (not illustrated) that controls a steering wheel of the vehicle 10.

Figure 6A:
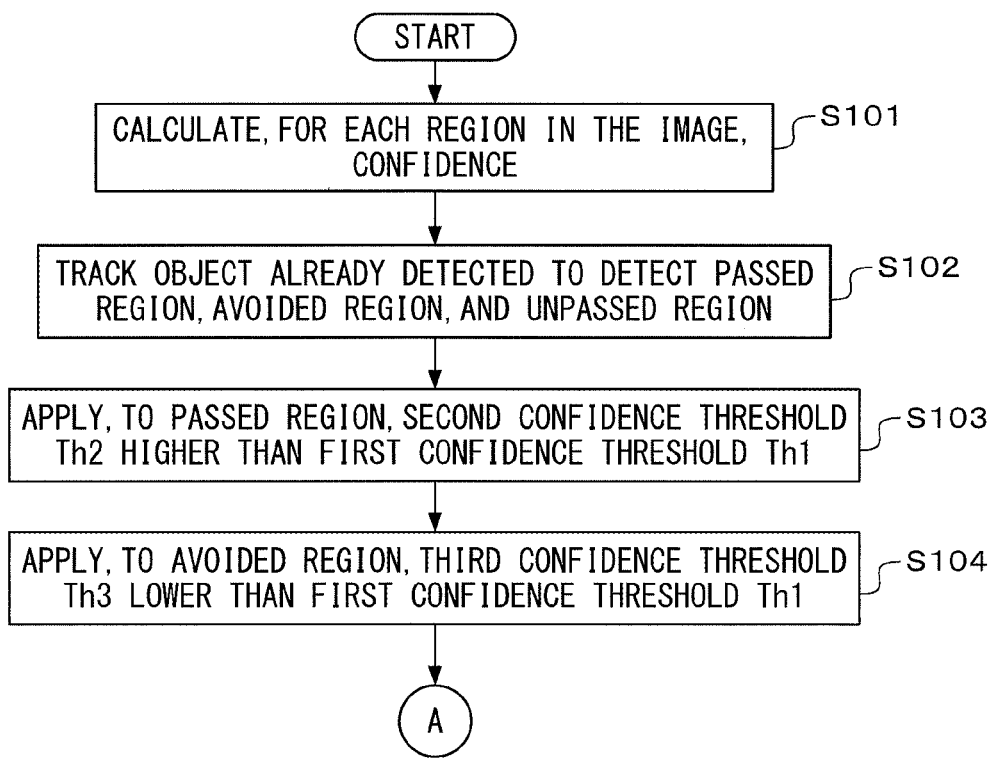
FIGS. 6A and 6B are an operation flowchart of the vehicle control process that includes the object detection process.
Figure 6B:
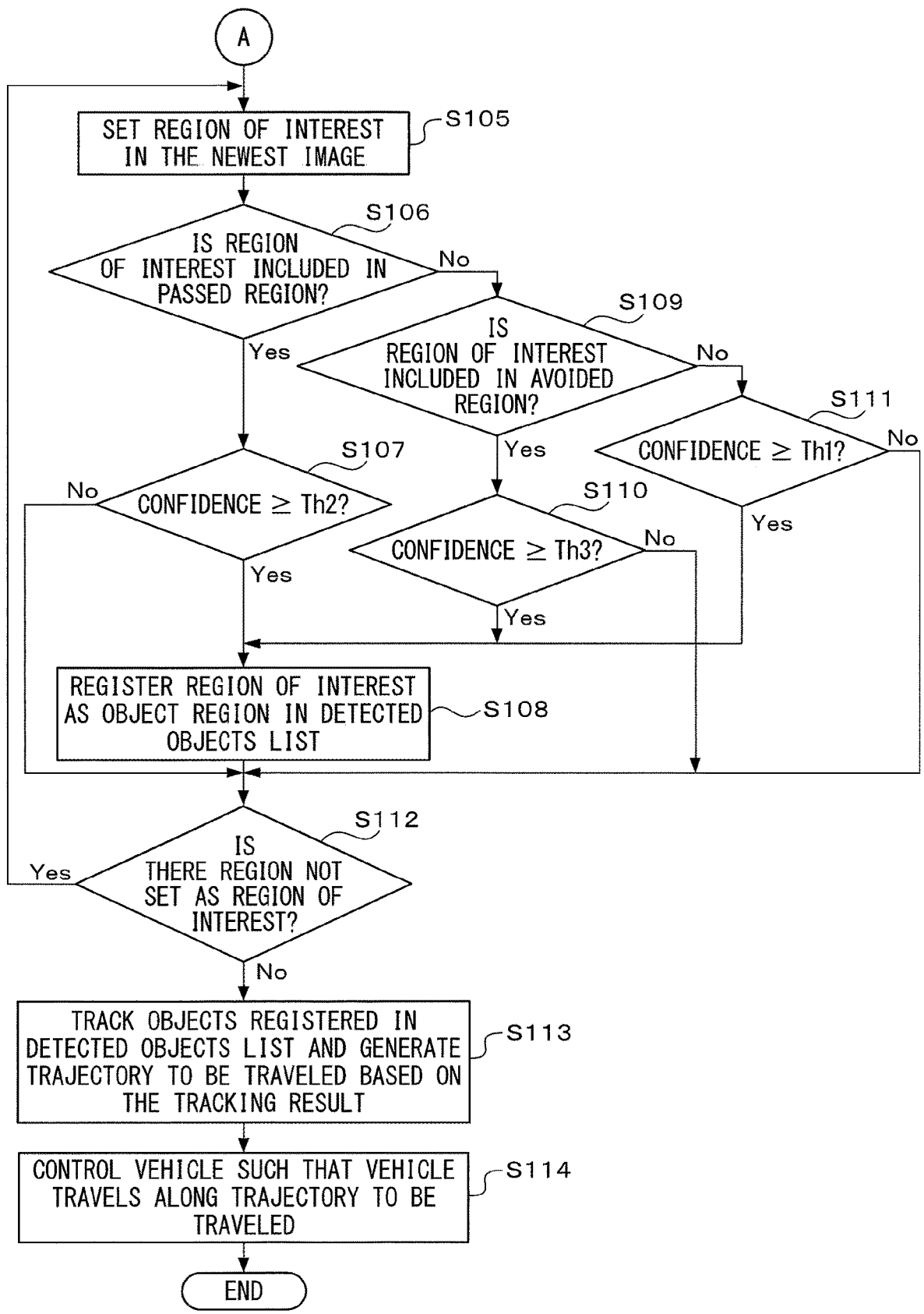

FIGS. 6A and 6B are an operation flowchart of the vehicle control process that includes the object detection process, executed by the processor 23. Every time the processor 23 receives an image from the camera 2, the processor 23 executes the vehicle control process in accordance with the operation flowchart illustrated in FIGS. 6A and 6B. Note that, in the operation flowchart illustrated below, processing steps from step S101 to step S112 correspond to the object detection process.

The confidence calculation unit 31 of the processor 23 inputs the newest image acquired by the camera 2 to the classifier to calculate, with respect to different regions in the image, a confidence for each type of object to be detected represented in the region (step S101).

In addition, the region detection unit 32 of the processor 23 tracks the object already detected in the past images, to detect a passed region through which the object being tracked has passed, an avoided region that the object being tracked has avoided, and an unpassed region (step S102). Then, the object detection unit 33 of the processor 23 sets the confidence threshold applied to the passed region to a second confidence threshold Th2, which is higher than a first confidence threshold Th1 which is applied to an unpassed region (step S103). Meanwhile, the object detection unit 33 sets the confidence threshold applied to the avoided region to a third confidence threshold Th3, which is lower than the first confidence threshold Th1 which is applied to the unpassed region (step S104).

Subsequently, the object detection unit 33 sets any one of plurality of regions with respect to which the confidence has been calculated in the newest image acquired by the camera 2 as a region of interest (step S105). The object detection unit 33 then determines whether the region of interest is included in the passed region (step S106). When the region of interest is included in the passed region (step S106-Yes), the object detection unit 33 determines whether the maximum value of the confidence calculated with respect to the region of interest is equal to or higher than the second confidence threshold Th2 (step S107). When the maximum value of the confidence is equal to or higher than the second confidence threshold Th2 (step S107-Yes), the object detection unit 33 determines that an object of the type corresponding to the maximum value of the confidence is represented in the region of interest, determines the region of interest as an object region, and registers the object represented in the region in the detected objects list (step S108).

On the other hand, in step S106, when the region of interest is not included in the passed region (step S106-No), the object detection unit 33 determines whether the region of interest is included in the avoided region (step S109). When the region of interest is included in the avoided region (step S109-Yes), the object detection unit 33 determines whether the maximum value of the confidence calculated for the region of interest is equal to or higher than the third confidence threshold Th3 (step S110). When the maximum value of the confidence is equal to or higher than the third confidence threshold Th3 (step S110-Yes), the object detection unit 33 determines that an object of the type corresponding to the maximum value of the confidence is represented in the region of interest, determines the region of interest as an object region, and registers the object represented in the region in the detected objects list (step S108).

On the other hand, in step S109, when the region of interest is not included in the avoided region (step S109-No), in other words, when the region of interest is included in the unpassed region, the object detection unit 33 determines whether the maximum value of the confidence calculated for the region of interest is equal to or higher than the first confidence threshold Th1 (step S111). When the maximum value of the confidence is equal to or higher than the first confidence threshold Th1 (step S111-Yes), the object detection unit 33 determines that an object of the type corresponding to the maximum value of the confidence is represented in the region of interest, determines the region of interest as an object region, and registers the object represented in the region in the detected objects list (step S108).

After step S108, or in step S107, S110 or S111, when the maximum value of the confidence is less than the confidence threshold applied to the region of interest (step S107, S110 or S111-No), the processor 23 determines whether there is a region not set as the region of interest (step S112). If there is a region not set as the region of interest (step S112-Yes), the processor 23 sets any such region as the region of interest, and repeats the processing after step S105.

On the other hand, if there is no region not set as the region of interest (step S112-No), the driving planning unit 34 of the processor 23 tracks, with reference to the detected objects list, the objects registered in the detected objects list, and generates a trajectory to be traveled for the vehicle 10 in such a way that the trajectory to be traveled is separated from the estimated trajectories of the objects estimated on the basis of the tracking result by a certain distance or more (step S113). Then, the vehicle control unit 35 of the processor 23 controls the vehicle 10 in such a way that the vehicle 10 travels along the trajectory to be traveled (step S114). Then, the processor 23 ends the vehicle control process.

Note that the processor 23 may change the order of processing in step S101 and the processing in steps S102 to S104, or parallelly perform both.

As described above, the object detection device tracks the object already detected and identifies the passed region through which the object has passed and the avoided region that the object has avoided. In addition, the object detection device sets a confidence threshold applied to a region in the image corresponding to the passed region to a higher value than a confidence threshold applied to a region in the image corresponding to the unpassed region. In this manner, the object detection device can prevent false detection of the object in the passed region. In addition, the object detection device sets the confidence threshold applied to a region in the image corresponding to the avoided region to a lower value than the confidence threshold applied to the region in the image corresponding to the unpassed region. In this manner, the object detection device can prevent failure in detecting an object even if the object present in the avoided region is a rare object. Therefore, the object detection device can improve detection accuracy. In addition, since the object detection device can determine whether the object to be detected is represented in respective regions in the image by executing processing requiring comparatively a large amount of calculation by the classifier only once, the object detection device can reduce the amount of calculation.

According to a variation, the confidence calculation unit 31 may calculate a confidence with respect to each region in the image by using a classifier other than a DNN. For example, the confidence calculation unit 31 may use, as the classifier, a support-vector machine (SVM) that has been learned in advance in such a way as to output, using a feature (for example, Histograms of Oriented Gradients, HOG) calculated with respect to a window set on an image as an input, the confidence for whether an object to be detected is represented in the window. The confidence calculation unit variously changes a position, a size, and an aspect ratio of the window set on the image, calculates the feature with respect to the window, and calculates the confidence with respect to the window by inputting the calculated feature to the SVM. Note that the SVM may be prepared for each type of object to be detected. In this case, the confidence calculation unit 31 may calculate, with respect to each window, the confidence for each type of object by inputting the feature calculated with respect to the window to each SVM.

According to another variation, the confidence calculation unit 31 may further calculate, with respect to each region in the image, a confidence for whether the region is a free space in which the vehicle 10 can travel. In this case, the classifier used by the confidence calculation unit 31 may be learned in advance in such a way as to calculate the confidence with respect to a free space assuming that one of the objects to be detected is the free space.

In this case, the object detection unit 33 may set a confidence threshold applied to a region of interest among the plurality of regions with respect to which the confidence has been calculated to the second confidence threshold, which is higher than the first confidence threshold applied to the unpassed region, when the maximum value of the confidence corresponds to the free space and the region of interest is included in a region in the image corresponding to the avoided region. In this manner, a possibility that the avoided region is determined as the free space is reduced, and the processor 23 can reduce, when there is some kind of object in the avoided region, a risk of collision between the object and the vehicle 10.

Alternatively, the classifier used by the confidence calculation unit 31 may have a configuration in which the classifier 400 illustrated in FIG. 4 is added with a segmentation unit to which the feature map output from the principal unit 401 of the classifier 400 is input and that has been learned in such a way as to output, for each pixel, the confidence that the pixel corresponds to a free space. In this case, the segmentation unit may have, for example, a configuration similar to that of any of CNN architectures for segmentation.

In this case, the object detection unit 33 may also set the confidence threshold for determining whether the pixel is a free space, which is applied to each pixel included in the region in the image corresponding to the avoided region, to a higher value than the confidence threshold applied to the unpassed region.

According to still another variation, other moving objects may travel in the passed region through which the object being tracked has passed. In view of this, the object detection unit 33 may set the confidence threshold applied to the passed region for each type of object. In this case, for example, when the region of interest is included in the region in the image corresponding to the passed region and the type of the object corresponding to the maximum value of the confidence calculated with respect to the region of interest is a moving object, the object detection unit 33 may set, similarly to the unpassed region, the confidence threshold applied to the region of interest to the first confidence threshold. In addition, when the region of interest is included in the region in the image corresponding to the passed region and the type of the object corresponding to the maximum value of the confidence calculated with respect to the region of interest is a stationary object or a low-speed moving object, the object detection unit 33 may set, similarly to the embodiments described above, the confidence threshold applied to the region of interest to the second confidence threshold, which is higher than the first confidence threshold. In this manner, the detection condition becomes tougher only for an object that should not be present in the passed region, and the processor 23 can prevent failure in detecting an object present in the passed region while preventing false detection of an object that should not be present in the passed region.

In addition, the object detection unit 33 may set, for each type of object, the confidence threshold applied to the avoided region, respectively. For example, when the region of interest is included in the region in the image corresponding to the avoided region and the type of the object corresponding to the maximum value of the confidence calculated with respect to the region of interest is a moving object, the object detection unit 33 may set, similarly to the unpassed region, the confidence threshold applied to the region of interest to the first confidence threshold. In addition, when the region of interest is included in the region in the image corresponding to the avoided region and the type of the object corresponding to the maximum value of the confidence calculated with respect to the region of interest is a stationary object or a low-speed moving object, the object detection unit 33 may set, similarly to the embodiments described above, the confidence threshold applied to the region of interest to the third confidence threshold, which is lower than the first confidence threshold. In this manner, the detection condition is relaxed only for an object that is likely to be present in the avoided region, and the processor 23 can prevent false detection of an object that should not be present in the avoided region while preventing failure in detecting an object that is likely to be present in the avoided region.

Note that the moving object may be, for example, an object with self-propelling ability (for example, cars, motorcycles, human beings, or bicycles). In addition, the stationary object may be, for example, an object without self-propelling ability (for example, objects placed on the road, fallen objects, road signs, or traffic lights). Furthermore, the low-speed moving object may be an object the absolute speed (relative speed relative to the ground) of which is significantly smaller (for example, less than ½ to ⅒) than that of the vehicle 10, for example, a human being or an animal other than human beings.

The object detection device according to the embodiments or the variations described above may be applied to a sensor signal acquired by a sensor other than the camera 2 for detecting an object existing around the vehicle 10. As such a sensor for detecting an object present in a predetermined detection range, for example, a LIDAR sensor or a laser sensor installed in the vehicle 10 may be used. In this case, the classifier used by the confidence calculation unit 31 may be learned in advance in such a way as to output the confidence, calculated from the sensor signal acquired by the sensor installed in the vehicle 10, for an object to be detected with respect to each plurality of regions set in the detection range of the sensor. In this case, the classifier may also be, similarly to the embodiments or the variations described above, a DNN or an SVM. In addition, in this case, each region is obtained in a real space and is expressed in a sensor coordinate system with the sensor at the origin; therefore, the region detection unit 32 may omit the viewing transformation process and the projection process in the embodiments described above. In other words, the passed region, the avoided region, and the unpassed region expressed in the sensor coordinate system may be used as they are.

According to yet still another variation, the object detection device according to the embodiments or the variations described above may be installed in a place other than an in-vehicle device. For example, the object detection device according to the embodiments or the variations described above may be configured to detect an object in an image generated by a monitoring camera installed in such a way that the monitoring camera images an outdoor or indoor predetermined region at every a certain period. When an object is detected for a definite period, the object detection device may display, on a display connected to the object detection device, a message indicating that the object is detected or output, to a speaker connected to the object detection device, a sound indicating that the object is detected.

Furthermore, a computer program for achieving functions of respective units of the processor 23 of the object detection device according to the embodiments or the variations described above may be provided in a form recorded in a computer-readable portable recording medium such as a semiconductor memory, a magnetic recording medium, or an optical recording medium.

As described above, those skilled in the art may make various modifications according to embodiments within the scope of the present invention.

What is claimed is:

1. An object detection device comprising:
a processor configured to:
calculate, for each of a plurality of regions in a predetermined detection range represented in the newest sensor signal among a plurality of sensor signals in time-series acquired by a sensor for detecting an object present in the detection range, a confidence indicating a degree of certainty that an object to be detected is represented in each of the plurality of regions;
track a first object, which has been detected in any of sensor signals preceding the newest sensor signal among the plurality of sensor signals, among the objects to be detected, to detect, in the newest sensor signal, a passed region through which the first object has passed;
control, for each of the plurality of regions in the newest sensor signal, a confidence threshold applied to a confidence for a second object among the objects to be detected according to whether or not each of the plurality of regions is included in the passed region; and
detect the second object in an object region, among the plurality of regions, with respect to which the confidence for the second object is equal to or higher than the confidence threshold of the object region,
wherein the processor is further configured to calculate the confidence for each type of the second object, and the processor sets the confidence threshold of the object region to a first confidence threshold when the type of the second object whose confidence is a maximum value of the confidences calculated for each type of the second object is a moving object or the object region is not included in the passed region, and the processor is further configured to set the confidence threshold of the object region to a second confidence threshold higher than the first confidence threshold when the type of the second object whose confidence is the maximum value is a stationary object or a low-speed moving object whose speed is lower than a speed of the moving object and the object region is included in the passed region.

2. The object detection device according to claim 1, wherein the processor is further configured to:
   track the first object to detect an avoided region that the first object has avoided in the detection range represented in the newest sensor signal; and
   set the confidence threshold applied to a region included in the avoided region among the plurality of regions to a lower value than the confidence threshold applied to a region, among the plurality of regions, other than the avoided region and included in an unpassed region through which the first object has not passed.

3. The object detection device according to claim 1, wherein the sensor is a camera configured to capture the predetermined detection range and the sensor signal is an image that is generated by the camera and in which the predetermined detection range is represented.

4. An object detection method comprising:
   calculating, for each of a plurality of regions in a predetermined detection range represented in the newest sensor signal of a plurality of sensor signals in time-series acquired by a sensor for detecting an object present in the detection range, a confidence indicating a degree of certainty that an object to be detected is represented in each of the plurality of regions;
   tracking a first object, which has been detected in any of sensor signals preceding the newest sensor signal among the plurality of sensor signals, among the objects to be detected, to detect, in the newest sensor signal, a passed region through which the first object has passed;
   controlling, for each of the plurality of regions in the newest sensor signal, a confidence threshold applied to a confidence for a second object among the objects to be detected according to whether or not each of the plurality of regions is included in the passed region; and
   detecting, in the newest sensor signal, the second object in an object region, among the plurality of regions, with respect to which the confidence for the second object is equal to or higher than the confidence threshold of the object region,
   wherein the method further comprises:
   calculating the confidence for each type of the second object;
   setting the confidence threshold of the object region to a first confidence threshold when the type of the second object whose confidence is a maximum value of the confidences calculated for each type of the second object is a moving object or the object region is not included in the passed region; and
   setting the confidence threshold of the object region to a second confidence threshold higher than the first confidence threshold when the type of the second object whose confidence is the maximum value is a stationary object or a low-speed moving object whose speed is lower than a speed of the moving object and the object region is included in the passed region.

5. A non-transitory computer-readable recording medium having recorded thereon a computer program for object detection that causes a computer to execute a process comprising:
   calculating, for each of a plurality of regions in a predetermined detection range represented in the newest sensor signal among a plurality of sensor signals in time-series acquired by a sensor for detecting an object present in the detection range, a confidence indicating a degree of certainty that an object to be detected is represented in each of the plurality of regions;
   tracking a first object, which has been detected in any of sensor signals preceding the newest sensor signal among the plurality of sensor signals, among the objects to be detected, to detect, in the newest sensor signal, a passed region through which the first object has passed;
   controlling, for each of the plurality of regions in the newest sensor signal, a confidence threshold applied to a confidence for a second object among the objects to be detected according to whether or not each of the plurality of regions is included in the passed region; and
   detecting, in the newest sensor signal, the second object in an object region, among the plurality of regions, with respect to which the confidence for the second object is equal to or higher than the confidence threshold of the object region, wherein the process further comprises:
   calculating the confidence for each type of the second object;
   setting the confidence threshold of the object region to a first confidence threshold when the type of the second object whose confidence is a maximum value of the confidences calculated for each type of the second object is a moving object or the object region is not included in the passed region; and
   setting the confidence threshold of the object region to a second confidence threshold higher than the first confidence threshold when the type of the second object whose confidence is the maximum value is a stationary object or a low-speed moving object whose speed is lower than a speed of the moving object and the object region is included in the passed region.

6. The object detection device according to claim 1, wherein the processor is further configured to estimate a path of the first object in real space by tracking the first object and detect the passed region based on the estimated path and a position and direction of the sensor when the newest sensor signal was generated.

* * * * *